United States Patent [19]

Steckler et al.

[11] Patent Number: 5,446,844
[45] Date of Patent: Aug. 29, 1995

[54] PERIPHERAL MEMORY INTERFACE CONTROLLER AS A CACHE FOR A LARGE DATA PROCESSING SYSTEM

[75] Inventors: Thomas M. Steckler, Christiana; Dana A. Gryger, Downingtown; Robert H. Tickner, Paoli, all of Pa.

[73] Assignee: Unisys Corporation, Blue Bell, Pa.

[21] Appl. No.: 741,963

[22] Filed: Aug. 5, 1991

Related U.S. Application Data

[63] Continuation of Ser. No. 104,473, Oct. 5, 1987, abandoned.

[51] Int. Cl.⁶ .............................................. G06F 13/16
[52] U.S. Cl. ............................ 395/250; 364/926.92; 364/926.93; 364/964.2; 364/238.3; 364/238.4; 364/243.4
[58] Field of Search ............... 364/DIG. I, DIG. II; 395/250, 275, 425

[56] References Cited

U.S. PATENT DOCUMENTS

| | | | |
|---|---|---|---|
| 3,588,829 | 6/1971 | Boland | 304/200 |
| 3,789,365 | 1/1974 | Jen | 364/200 |
| 4,056,845 | 11/1977 | Churchill | 364/200 |
| 4,186,438 | 1/1980 | Benson et al. | 364/200 |
| 4,499,539 | 2/1985 | Vosacek | 364/200 |
| 4,736,293 | 4/1988 | Patrick | 364/200 |

*Primary Examiner*—David Y. Eng
*Attorney, Agent, or Firm*—Nathan Cass; Mark T. Starr

[57] ABSTRACT

An interface controller coupled between the main memory system and the I/O system of a large data processing system which controller is able to receive memory access requests from a number of different peripheral devices. The memory interface controller is provided with a data array for holding a number of data words fetched from memory which data array in turn is addressed by the output of an address array. The address array is an associative memory that can associate a given main memory address, of data in the data array, with a data array address containing data stored in main memory at that main memory address so that actual main memory access need not be required.

6 Claims, 5 Drawing Sheets

PERIPHERAL MEMORY INTERFACE CONTROLLER AS A CACHE FOR A LARGE DATA PROCESSING SYSTEM

This application is a continuation of patent application Ser. No. 07/104,473, filed Oct. 5, 1987, now abandoned.

BACKGROUND OF THE INVENTION

1. Field of the Invention

This invention relates to a peripheral memory interface controller having a high bandwidth and more particularly for such a peripheral memory interface controller for a large data processing system having many hundreds of peripheral units.

2. Description of the Prior Art

In large commercial data processing systems for use in financial institutions and other endeavors, the very size of this system is a result of the huge amounts of data which must be processed. This in turn entails provision of a large input/output system to transfer the data to and from the periphery of the system and main memory. In some earlier systems, a number of I/O processors were employed to handle such data transfers such as illustrated in the Bock et al U.S. Pat. No. 3,654,621. However, in this situation, provisions must be made for the synchronization or at least scheduling of the I/O processors so that they are not both working on the same job at the same time. Furthermore, such large data processing systems employ a number of central processors for the actual data processing and thus, there are a number of requestors in contention for access to the main memory system which in turn slows down the throughput of the system.

It is, therefore, preferable to have only one I/O system contending for access to main memory and to provide that I/O system with a large bandwidth and also other features which minimize memory accesses to as large a degree as possible.

A particular I/O system is disclosed in the Peacock et al application U.S. Ser. No. 926,588, filed Nov. 4, 1986 and assigned to the assignee of the present application. Among other things, this application and related applications are directed towards means for offloading control of the I/O operations from the operating systems of the data processing system, managing disk caches in main memory thereby reducing the number of disk accesses required, and initiating independent operations of various port adapters or bus drivers with automatic data transfer from various selected peripheral devices. The present invention is directed towards a memory interface controller which interfaces between this I/O periphery and main memory and serves to act as a cache itself so as to reduce the number of memory requests by the I/O and to receive such memory requests in a pipelined fashion so as to increase the bandwidth between main memory and the periphery.

It is then an object of the present invention to provide an improved interface controller for memory-periphery data transfers in a large data transfer system.

It is another object of the present invention to provide an improved memory interface controller which serves as a cache between the periphery and main memory so that many memory requests can be handled in the interface controller without an actual memory access being required.

It is still a further object of the present invention to provide an improved memory interface controller for a large data processing system which serves to receive multiple memory requests from the periphery of the system in a pipelined or overlapped fashion so as to provide better bandwidth for memory-periphery data transfer.

SUMMARY OF THE INVENTION

In order to accomplish the above-identified objects, the present invention is directed towards an interface controller coupled between the main memory system and the I/O system of a large data processing system which controller is able to receive memory access requests from a number of different requestors. The memory interface controller is provided with a data array for holding a number of data words which in turn are addressed by the output of an address array. The address array is an associative memory that can associate a given main memory address, of data in the data array, with a data array address containing data stored in main memory at that main memory address so that actual main memory access need not be required. If the requested data and its associated main memory address are not in the data array and address array, then the request is sent to a queue in a request initiate module and the system is pipelined so that, in this manner, a number of different requests can be passing through the controller at a given time.

A feature then of the present invention resides in a buffer memory system with appropriate interface control to serve as a cache for memory access requests from various requestors on the periphery of a large data processing system.

BRIEF DESCRIPTION OF THE DRAWINGS

The above and other objects, advantages and features of the present invention will become more readily apparent from a review of the following description when taken in conjunction with the drawings wherein.

GENERAL DESCRIPTION OF THE INVENTION

Figure 1:
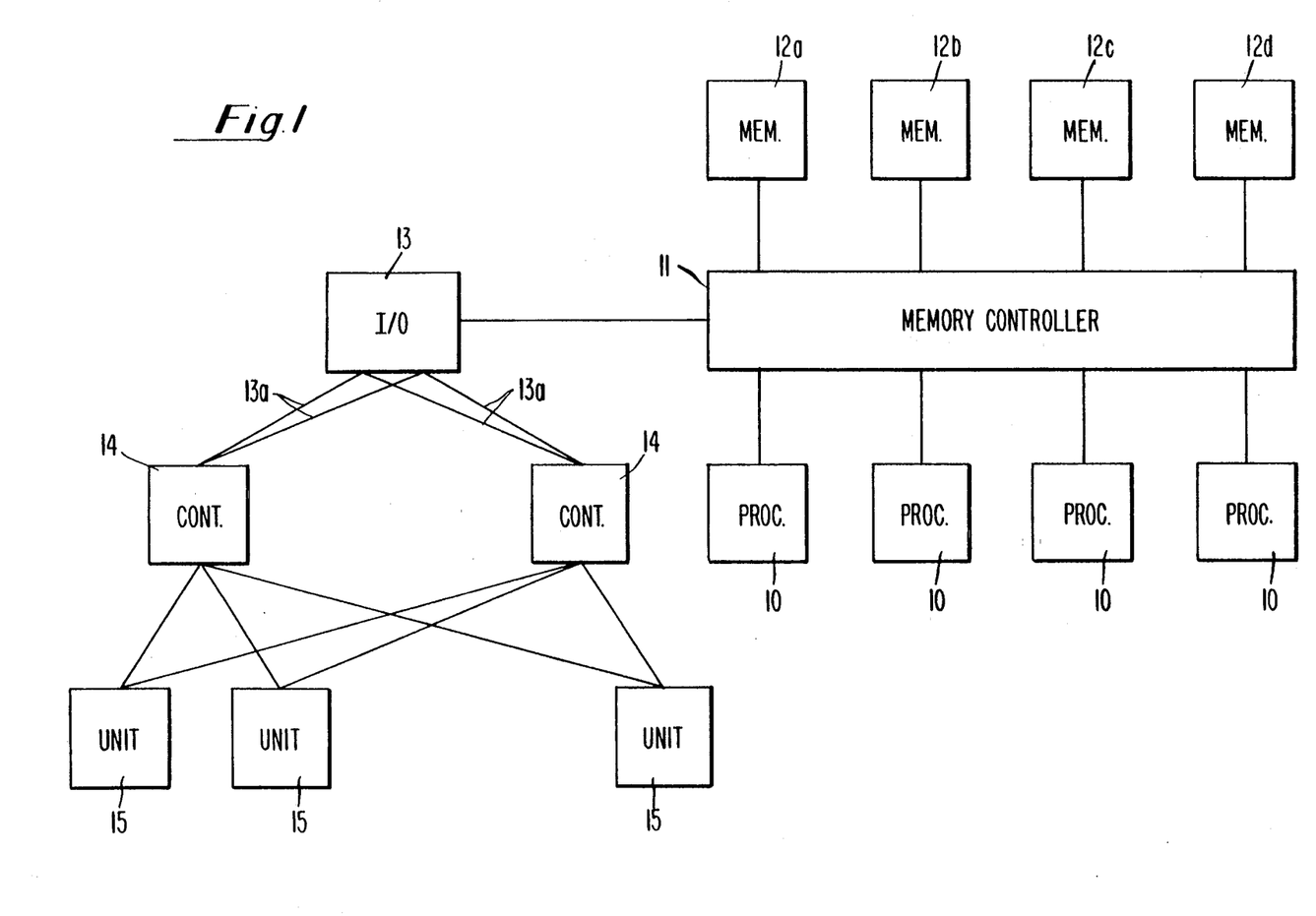
FIG. 1 is a block diagram of a large data processing system such as might employ the present invention.

A system employing the present invention is illustrated in FIG. 1. As shown therein, this system is a very large multi-processing system having a plurality of central processors 10 which are coupled to another plurality of main memory modules 12 by way of memory controller 11 which allows any processor to address any memory module.

More specifically, the present invention resides in I/O system 13 which controls all communication and data transfer between peripheral units 15 and main memory modules 12. I/O system 13 can also communicate with respective central processors 10 by way of memory controller 11. It is to be noted in FIG. 1, that there are a plurality of controllers 14 coupled between the respective peripheral units 15 and I/O system 13 by way of a plurality of buses 13a and controllers 14. Peripheral units 15 may include any type of peripheral device or storage including large disk drives in which are stored the operating systems of the data processing system of FIG. 1 and also critical user data.

Figure 2:
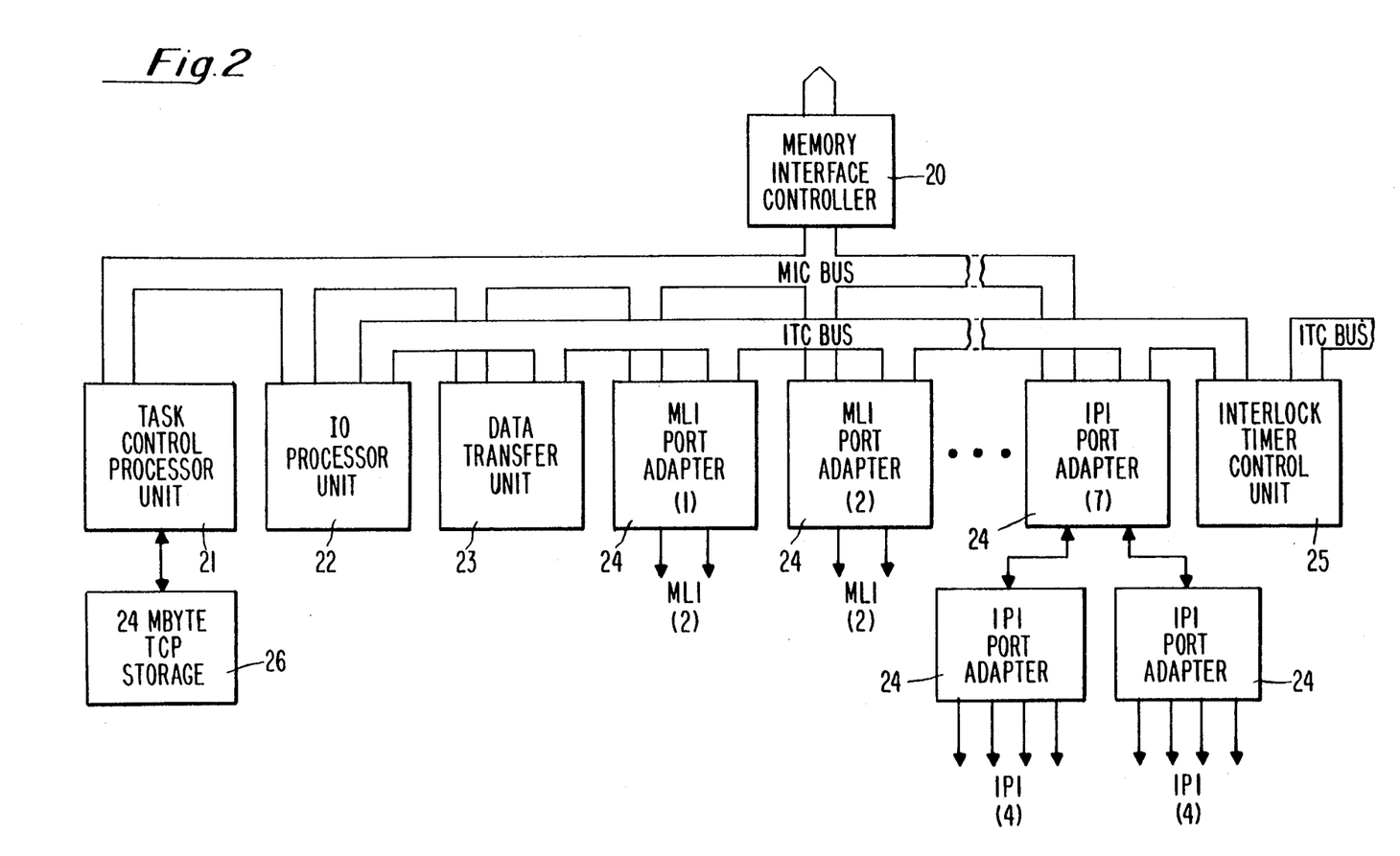
FIG. 2 is a block diagram of the various subsystems of the I/O system of FIG. 1.

I/O system 13 of FIG. 1 is shown in more detail in FIG. 2 and contains a number of different units that interface by way of memory interface controller 20 with memory controller 11 of FIG. 1. As shown in FIG. 2, I/O system 13 includes task control processor 21 which handles all process scheduling on respective central processors 10 of FIG. 1 and also keeps track of various events upon which different processes might be waiting. I/O processor 22 is the heart of the I/O system and performs all of the principal functions such as initiating data transfer to or from the periphery. Data transfer unit 23 is employed to move data between different areas of main memory and is specifically useful in the disk cache mechanism that is employed in the system of FIG. 1. Port adaptors 24 are basically bus drivers for the respective buses 13a of FIG. 1 although they may employ different protocols. Interlock timer control 25 distributes interrupts to various buses. Task control processor 21 is described in detail in the Jennings et al application U.S. Ser. No. 787,781, filed Oct. 15, 1985 and assigned to the same assignee as the present invention. All of these units shown in FIG. 2 require access to main memory and thus become requestors to memory interface controller 20 which is the heart of the present invention.

While the embodiment of the present invention being described envisions the employment of only one I/O system 13 of FIG. 1, the system of FIG. 1 can employ two such I/O systems. However, with such a configuration only one processor unit 22 can be running at any one time, although once operation is initiated, all of the port adaptors 24 in both systems can be operating in a given time.

Figure 3:
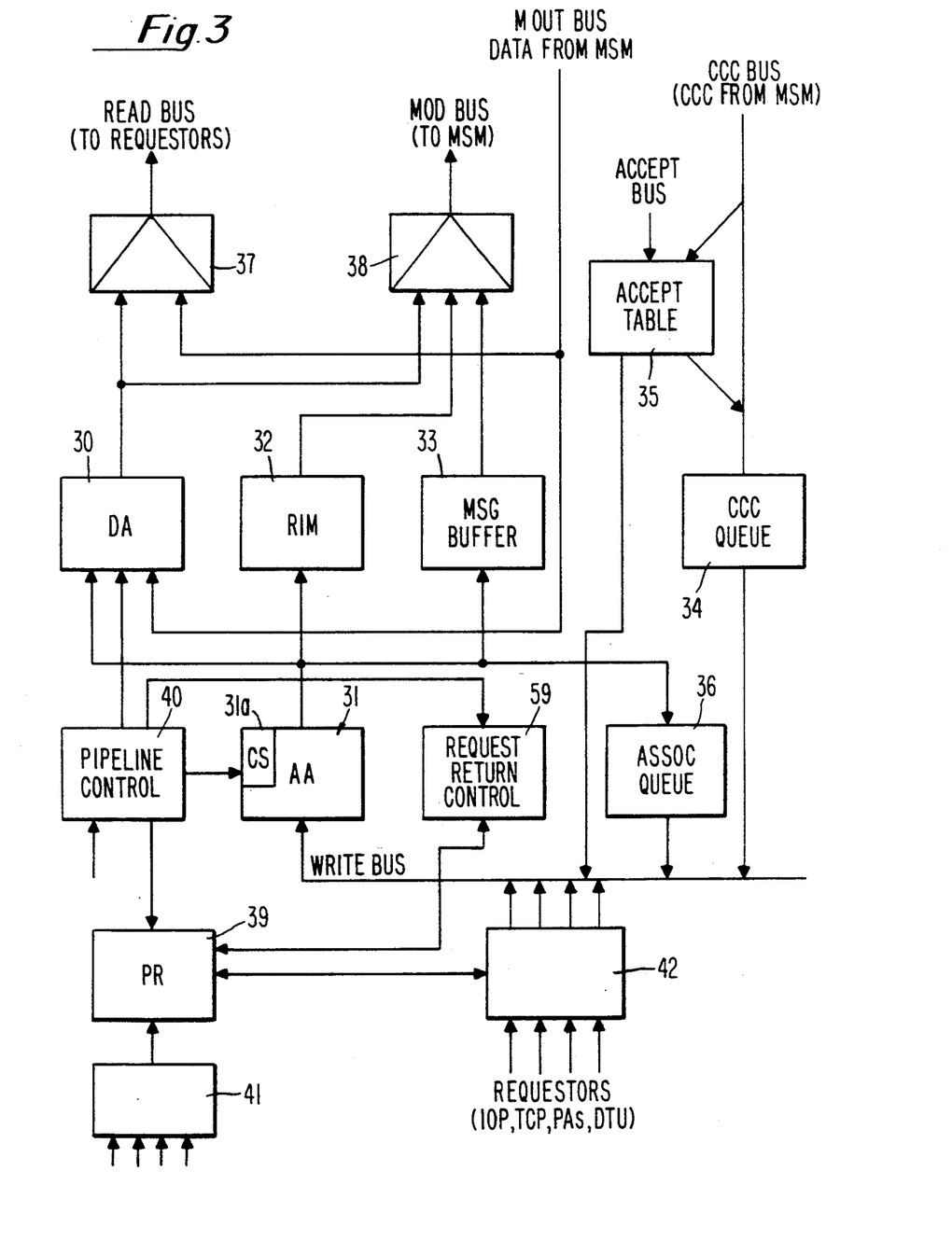
FIG. 3 is a block diagram of the memory interface controller of the present invention.

FIG. 3 is a block diagram of memory interface controller 20 of FIG. 2 which controller embodies the present invention. In FIG. 3, the basic functional units are data array 30 and address array 31 which serves to form the cache of the present invention, request initiate module 32 and its associated message buffer 33. Cache control command queue 34, accept table 35 and associative queue 36 are the main functional units of the request return module to be further described below.

Pipeline control 40, which may be either combinatorial logic for increased speed or may be a control store, coordinates the pipeline of requests from the time they are received by the memory interface controller until the requests have been completed. Priority resolver 39 receives the requests from the various requestors of FIG. 2 and accepts them according to some priority by way of write bus 42.

In operation, when a request is received from one of the requestors of FIG. 2 for memory access, that request is received by priority resolver 39 and, if there are no other higher priority requests concurrently received, the main memory address associated with that request is transferred to address array 31 which, as described above, is associative memory containing all main memory addresses, the data of which has been stored in data array 30. If such is the case, a data array address associated with that main memory address in address array 31 is sent to data array 30 and the data is read out to the requestor by way of multiplexor 37. If the main memory address does not exist in address array 31, the main memory data is not stored in data array 30 and the main memory access request is transferred to associative queue 36 and address array 31 formulates a memory request which is sent to request initiate module 32 for further processing. When the main memory request has been accepted by memory controller 11 of FIG. 1, the main memory address is transferred to memory controller 11 by way of multiplexor 38.

All memory access requests are handled by request initiate module 32 with message buffer 33 serving merely to transfer non-memory requests or messages between the requestor and memory controller 11 of FIG. 1. I/O requests are originally initiated by one of central processors 10 of FIG. 1 and handled by I/O processor 22 of FIG. 2 which selects an appropriate port adapter 24 of FIG. 2 as described in the Peacock, et al U.S. Ser. No. 926,568, filed Nov. 4, 1986 and assigned to the assignee of the present invention. This selected port adapter then becomes the requestor to the memory interface controller of FIG. 3.

The various functions performed by address array 31 are under the control of address array control store 31a which, is synchronized by pipeline control 40. The address array module also contains a prefetch algorithm which permits the various requestors to make data present to the memory interface controller prior to the time that the data is actually required. When used with long sequential data transfer operations, this prefetch algorithm produces an almost 100% hit rate in the memory interface controller. The prefetch algorithm is serviced by the address array the same as are the internal requestors.

In addition to servicing requests from the various requestors and the prefetch algorithm, address array 31 also accepts operations from the request return module to be more thoroughly described below and from the address array itself. Operations originating from the request return module are concerned with updating the status of given data set that has become present in data array 30. Operations originating from the address array itself and operations targeted against these data sets are either status changes (i.e. a page has been requested but is not present) or a replacement algorithm update.

Data array 30 provides the actual cache data storage accessed by three sources: the request return module to be described below, request initiate module 32 and address array 31. Such accesses from the different accessing modules are assigned different priorities. It should be noted that selection of a given request is not only dependent upon the requestor's priority as described below and the status of other requestor's requests but also upon the type of operation and the availability of the read registers on the storage structure's read output ports.

The request return module (to be described below) has the highest priority in accessing data array 30 and presents two classes of operations to the data array; stores to the data array as a result of a data stream returning from main memory and fetch retries caused by deferred requests being awakened in associative queue 36.

Request initiate module presents only read operations to the Data Array 30. This request initiate module has second priority into the memory structures.

Operations of Address Array 31 are assigned the lowest priority and perform both reads and writes into data array 30. Thus, these operations must tolerate preemption when attempting to access data structures in data array 30. This is controlled by pipeline control 40.

DETAILED DESCRIPTION OF THE INVENTION

Address Array 31 is an associative memory which is divided into 256 congruence classes or groups of storage locations that are contiguous with one another so as to form such a congruent class. Each congruence class has four pages of words each with four words per page.

Data Array 30 provides storage for 4K data words and is logically organized into same number of congruence classes each of which has the same number of word pages per class. In order to provide for efficient access to this data, the storage is physically organized into two independent 2K by one word structures. The 4K address space is partitioned such that all even addresses reside in one physical structure while all odd addresses reside in the other structure.

Figure 5:
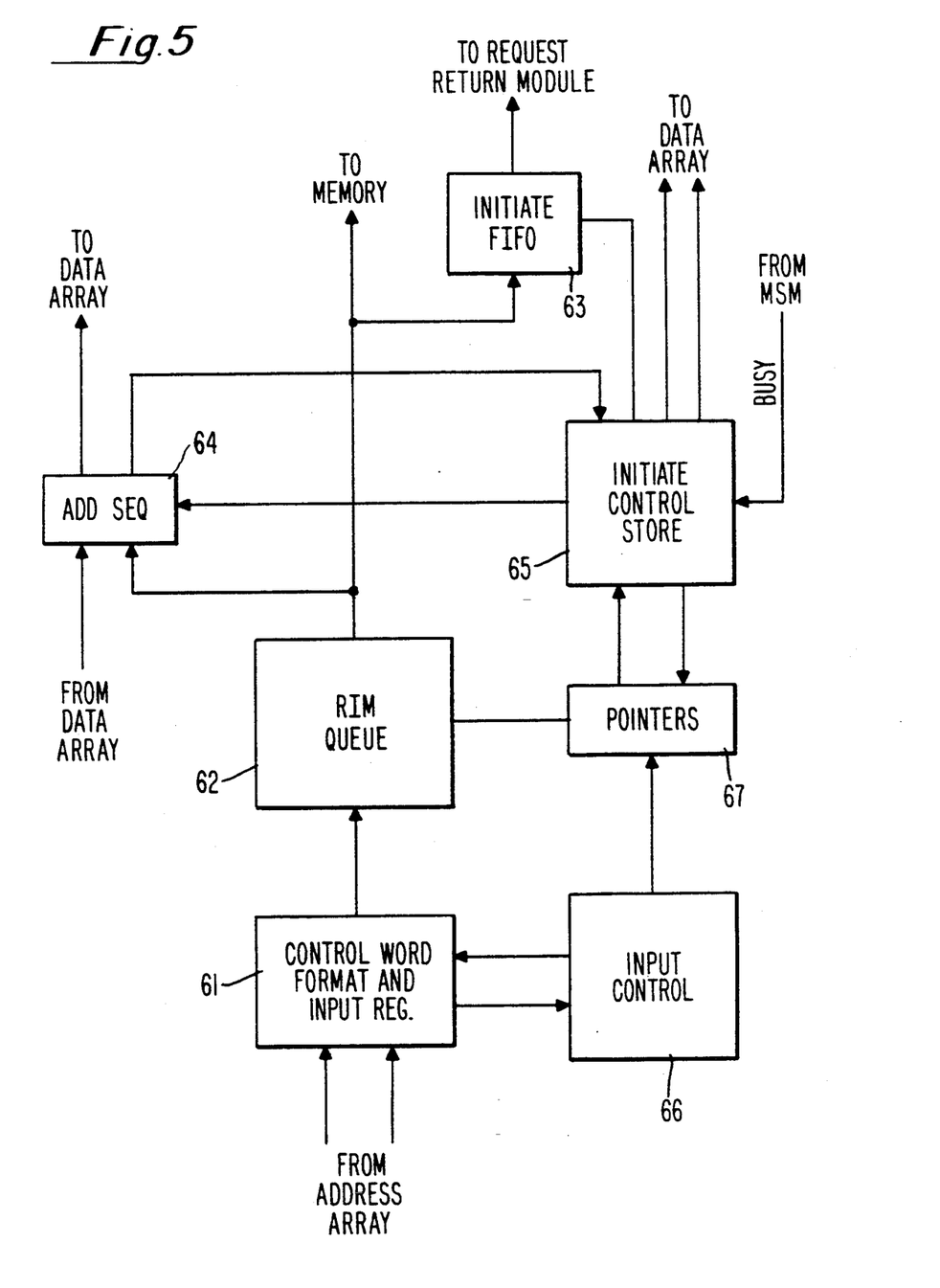
FIG. 5 is a block diagram of the request initiate module of memory interface controller of the present invention.

The request return module which is not explicitly shown in FIG. 3 is illustrated in FIG. 5. In FIG. 5, it is seen that the substative elements are associative queue 36, accept table 35 and cache control command queue 34 of FIG. 3. The request return module is under the control of control store 59 which is illustrated in FIG. 3 but has not yet been described. In FIG. 3, the request return control store 59 is shown as interacting with pipeline control 40 and priority resolver 39 of FIG. 3. In this manner, the priority for accessing data array 30, as described above, is implemented.

Figure 4:
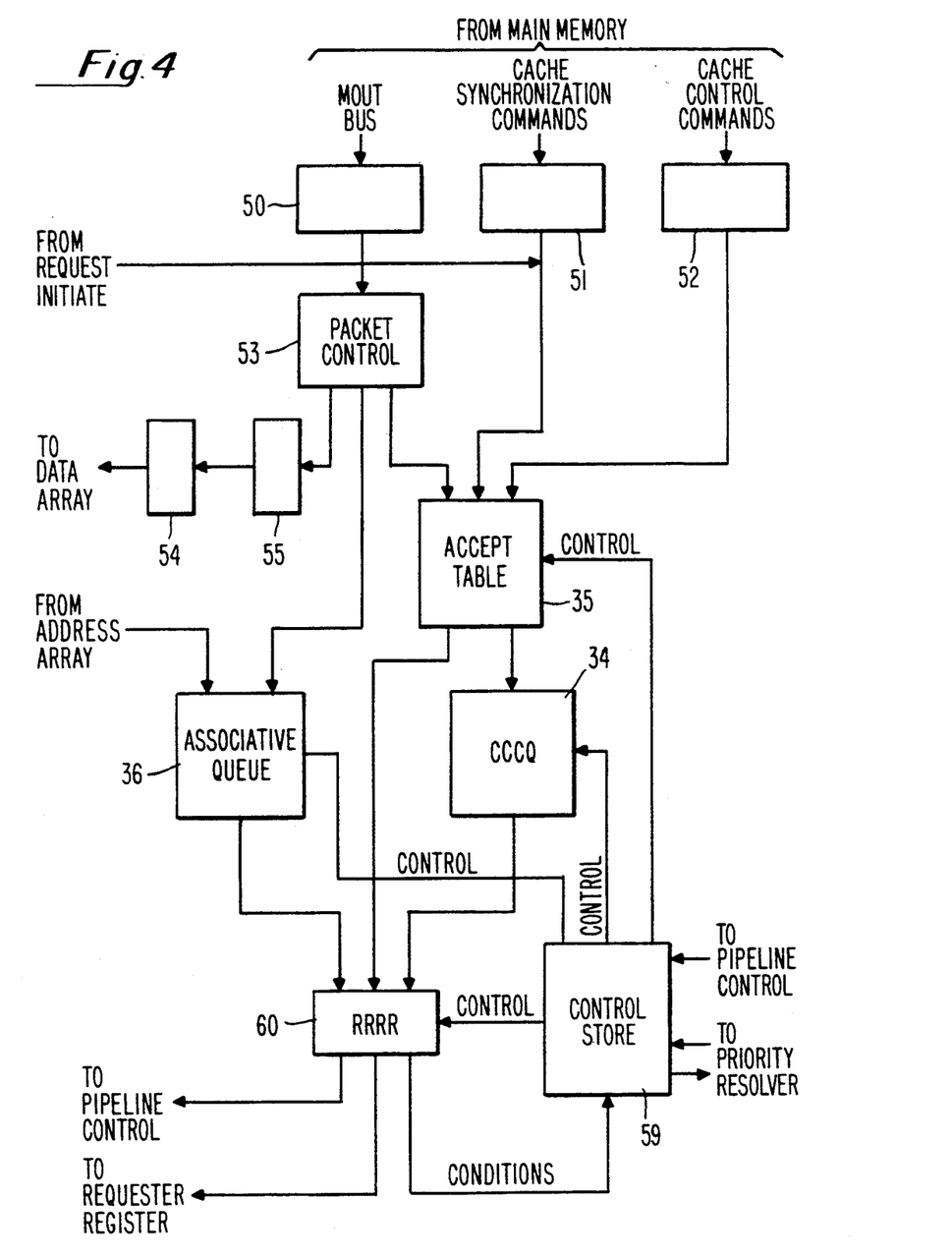
FIG. 4 is a block diagram of the request return module of the memory interface controller of FIG. 3.

The function of the request return module of FIG. 4 is to handle all communication from main memory to the various requestors. The communication from main memory falls into one of two categories: message traffic and memory system traffic. Memory system traffic is further divided into two categories: cache control and data operations.

Cache control traffic is comprised of accept information received from main memory by cache synchronization command register 51 and accept table 35. This information is used to interpret and perform consistency checks on cache control commands. The receipt of accept information from main memory indicates that the translation table in main memory agrees with address array 31 of FIG. 3. This information is necessary to determine if a cache control command is targeted for the "old" or "new" page when that page is busy in address array 31.

Cache control commands consist of unsolicited requests to either return a given data set to main memory, purge a given data set within the cache of the present invention or both. The memory interface controller incorporates a distributed cache table mechanism in that accept table 35 is functionally a part of cache tables in address array 31.

Because accept information is time related to cache control commands, the request return module processes both accepts and cache control commands immediately upon receipt.

Cache control commands are received from main memory by way of cache control input register 52 and sent to accept table 35 and then to cache control command queue 34. The mechanization of the cache memory system of the present invention requires that the request return module of FIG. 4 check the accept status of all cache control commands immediately upon receipt. The accept status along with the cache control command will then be forwarded to the address array 31 of FIG. 3 for processing.

Data operations, as viewed by the request return module, consist of either a main memory complete information or the reception of a data packet from main memory by way of register 50 and then to data array 30 by way of registers 54 and 55 under control of packet control 53. Receipt of a data packet from main memory indicates the completion of an earlier data request operation. Upon receipt of the data packet from main memory, the request return module associates each packet with the previous deferred cache memory operation (which resulted from a cache miss). When this association has been performed, information as to the disposition of the received data packet can be ascertained. With this disposition information, the request return module will immediately route all data words in the packet directly to the appropriate physical locations in data array 30.

In addition, if the replacement was invoked because of a cache miss on a read operation, the appropriate data word will be copied from the incoming data packet and routed via data array 30 directly to the proper requestor by way of multiplexer 37 of FIG. 3. Finally, because the receipt of the data packet by main memory indicates the completion of a memory operation, the request return module will send status information to address array 31 and reschedule all deferred requests targeted against the data set in question. Once the address array 31 has been updated, no requestor origninated requests may be processed until all deferred requests for the data set in question have been processed.

As has been stated above, associative queue 36 is the mechanism which provides a means for associating deferred requests or memory requests and the completing of a main memory request. Associating main memory registers, as they complete, with the deferred request ensures the shortest possible service time for a given request. The associative queue can associate deferred requests with up to eight outstanding main memory requests (job class). Each of the outstanding main memory jobs can have up to 16 deferred request words associated with it.

Associative queue 36 is under the control of request return control store 59 as are the other main elements of FIG. 4 including request return register 60 which can receive inputs from associative queue 36, accept table 35 and cache control command queue 34 to in turn supply conditions and other information to control store 59 and also communications to pipeline control 40 of FIG. 3 and priority resolver 39 of FIG. 3.

The request initiate module is illustrated in FIG. 5. Its function is to generate memory requests from the request information received from address array 31 of FIG. 3, to present control words and any associated data or message words to the memory controller 11, and to present job related information for each request to the Initiate FIFO 63. The associated data words are read from the data array 30 of FIG. 3, while the associated message words are read from the message buffer 33 of FIG. 3.

Memory requests are generated by address array 31 as was described above and are of two types: those which require a control word only and those which require a control word and data.

When a control word only operation is required to be performed, the necessary information is sent from address array 31 of FIG. 3 to control word formatter 61 of FIG. 5 which, under control of input control module 66 generates a main memory compatible control word which will cause main memory to perform the desired operation. This control word is then transferred to queue 62 and then to main memory during the next available bus cycle on the main memory bus. In parallel with this operation, information passes to request initiate FIFO 63 for use by the request return module of FIG. 4 at a later time to process "accepts" of cache synchronization commands from main memory. The information which is passed to the FIFO is the main memory job number, a job number valid flag to indicate whether or not the job number was assigned and the associated cache memory congruence class and page number.

When a control word and data operation are requested, the necessary information to construct the main memory control word is again transferred to control word formatter 61 of FIG. 5 and to queue 62. However, before this control word is placed on the memory bus, the request initiate module of FIG. 5 must check to see if the request presently occupying the physical address register of data array 30 is targeted against the page that is about to be returned to main memory. If it is, the request initiate module will not issue the main memory control word until this request is processed. Once it is determined that the physical address register in data array 30 does not contain a conflicting request, the main memory control word will issue on the next available bus cycle. As soon as the control word is issued, the request initiate module of FIG. 5 will begin issuing a command stream sequence to data array 30 of FIG. 3 to read the required page, sequentially, therefrom. The data which is read from data array 30 is immediately placed on the memory bus. As was the case with the control word only operation, an operation to load required information to the initiate FIFO is performed in parallel with the control word and data transfer operation.

A cache control command response is performed exactly the same as a control word and data operation. The only exception is that information stored in initiate FIFO 63 of FIG. 5 will indicate that no memory job number is assigned to the job. This fact has special significance for the request return module of FIG. 4.

Message traffic is similar to control word with data operations except that the data comes from message buffer 33 of FIG. 3 instead of data array 30. Because data comes from message buffer 33, there is no need to check the data array physical address register for a conflicting request. Also, information sent to initiate FIFO 63 of FIG. 5 will indicate that this is a message operation. Again, this fact has meaning to the request return module of FIG. 4.

Epilogue

A cache interface has been disclosed for use between the main memory system and the I/O system of a large data processing system which cache is able to receive memory access requests from a number of different requestors on the periphery. The cache serves to reduce the number of main memory accesses required by fetching an entire page of data from main memory when a data item in that page does not reside in the cache. If the memory access request can not be serviced by the cache, then the request is sent to a queue in a request initiate module which generates a new request to access memory and the system is pipelined so that a number of different requests can be passing through the interface at a given time.

While but one embodiment of the present invention has been disclosed, it will be apparent to those skilled in the art that variations and modifications may be made therein without departing from the spirit and scope of the invention as claimed.

What is claimed is:

1. In a data processing system having at least one central processor, a main memory including a memory controller coupled to said processor for providing access thereto, the combination comprising:

a plurality of peripheral requestors external to said processor and said main memory, each requestor providing a data request indicating a request for main memory data;

an interface coupled between said requestors and said main memory controller;

said interface comprising:

first means for receiving main memory data requests from said requestors;

a cache memory for storing main memory data;

second means for determining whether main memory data requested by a requestor is stored in said cache memory and if so for reading out the requested data from said cache memory and sending it to the requestor;

third means for requesting data from said main memory when data requested by a requestor is found not to be stored in said cache memory;

said third means including a queue for storing a plurality of main memory requests whose requested data are not stored in said cache memory, a data request from a requestor being stored in said queue when the requested data is found not to be stored in said cache memory; and fourth means for receiving main memory data sent from said main memory as a result of data requested by a requestor having been found not to be stored in said cache;

said fourth means associating received main memory data with the corresponding data request stored in said queue and in response thereto routing the received main memory data to the corresponding requestor without the requestor having to send another request, said received main memory data also being stored in said cache memory;

said fourth means providing for receiving cache control commands and data from said main memory for updating the data stored in said cache memory;

said fourth means including accept table means responsive to said cache control commands for providing consistency status of data stored in said cache memory with respect to data stored in said main memory so that a cache control command is targeted to the proper data in said cache memory, and wherein said access table means is accessed by said fourth means before performing operations affecting data in said cache memory.

2. The interface of claim 1, wherein said requestors include peripheral unit requestors, wherein said first means for receiving main memory data requests from said requestors provides for receiving memory data requests on a priority basis and in a pipelined manner, and wherein said queue stores a plurality of main memory requests whose requested data was found not to be stored in said cache memory.

3. The interface of claim 2, wherein the storing of received main memory data in said cache by said fourth means has a greater priority than the reading out of requested data from said cache memory by said second means in response to a data request from a requestor.

4. The interface of claim 2, including prefetch means permit for causing data to be made available in said cache memory prior to the time that the data is actually requested by requestor.

5. The interface of claim 2, wherein said second means includes an associative address array for addressing said cache memory, wherein said associative address array contain addresses corresponding to main memory addresses, and wherein each data request from a requestor includes a main memory address.

6. The interface of claim 2, wherein said fourth means provides for receiving cache control commands and data from said main memory for updating the data stored in said cache memory.

* * * * *